C. B. YAW.
TYPE WRITING MACHINE.
APPLICATION FILED JAN. 21, 1909.

984,338.

Patented Feb. 14, 1911.
5 SHEETS—SHEET 3.

WITNESSES:
J. B. Dewis
M. W. Pool

INVENTOR:
Chas. B. Yaw
By Jacob Felbel
HIS ATTORNEY

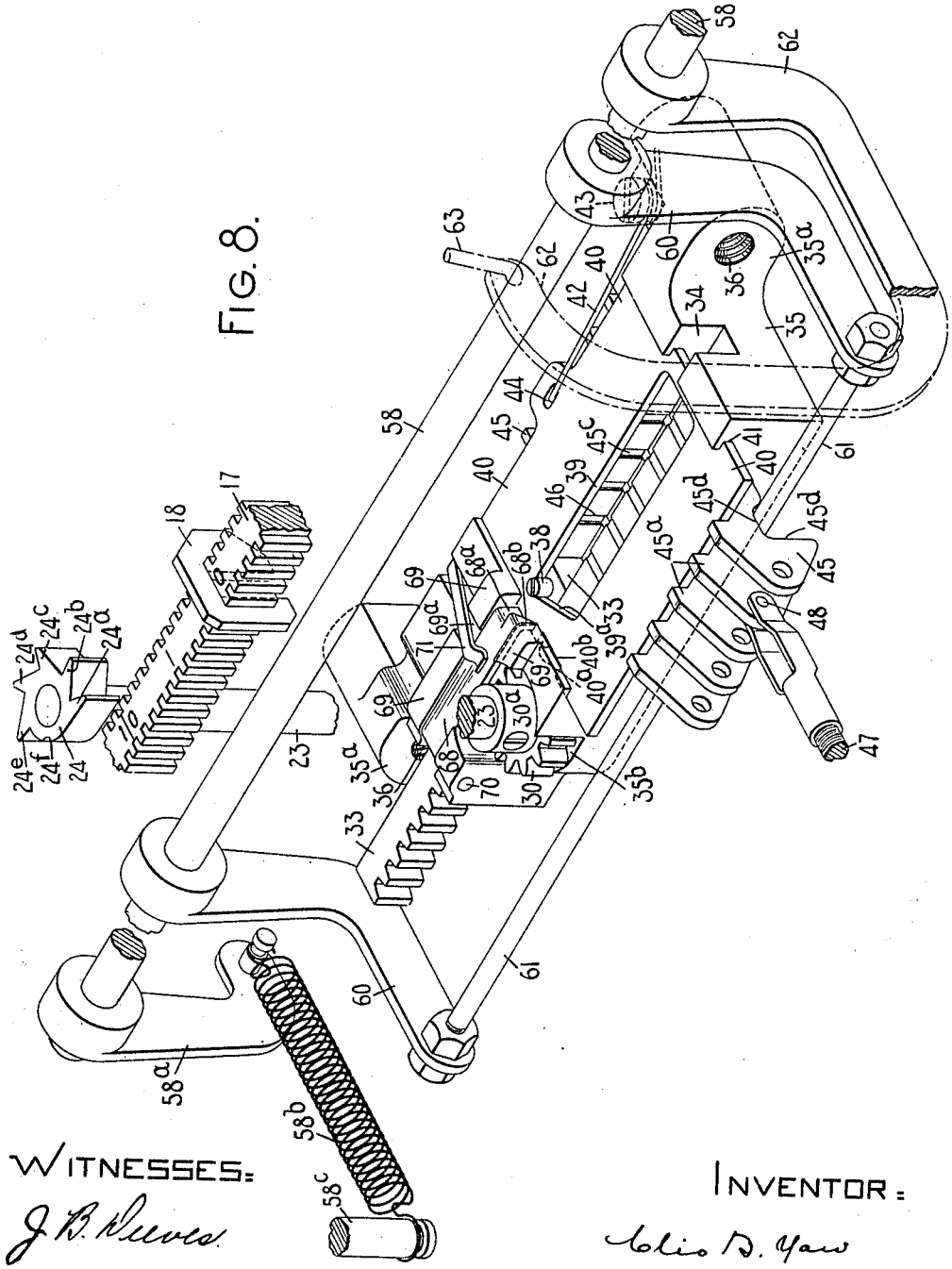

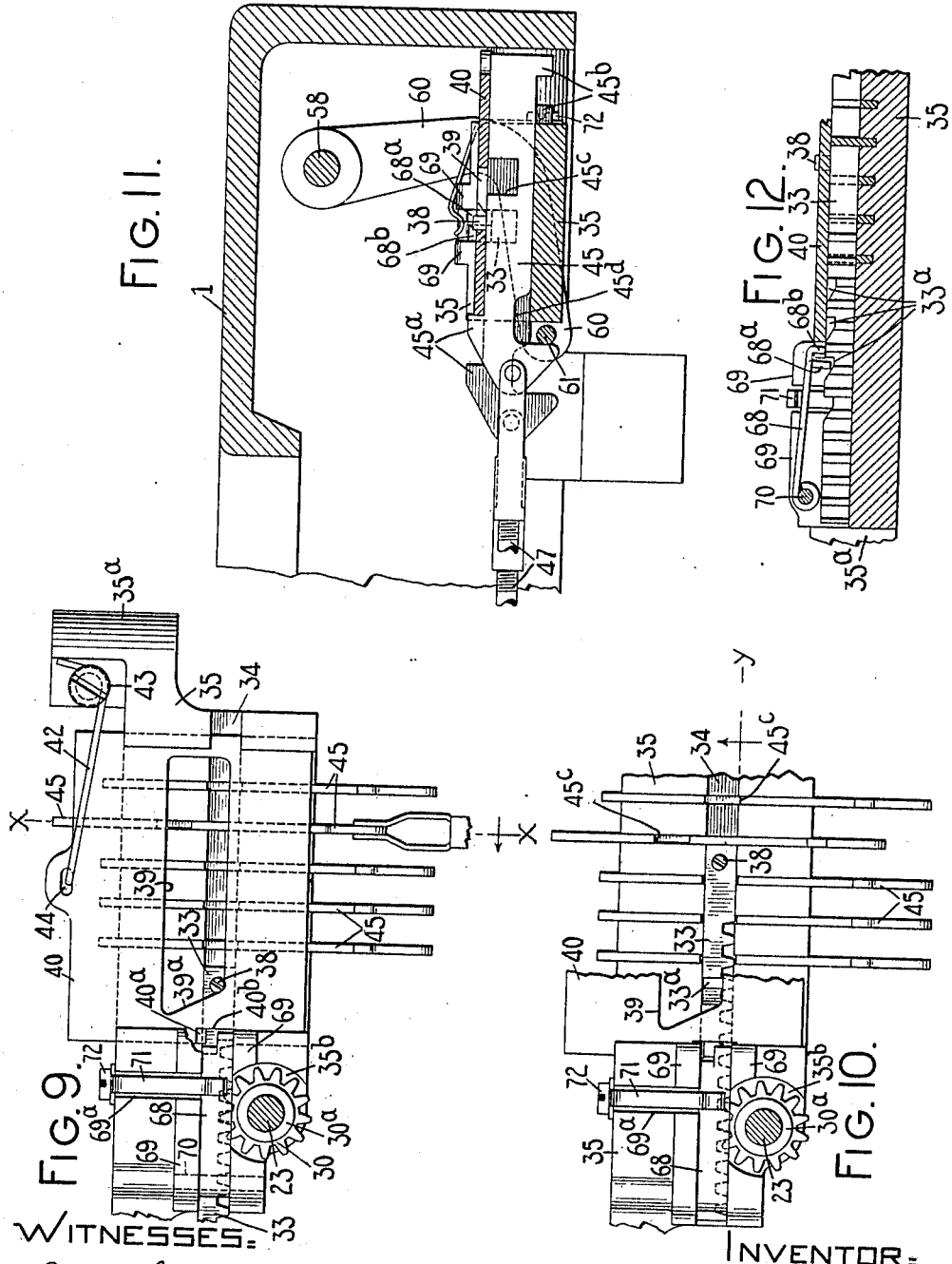

UNITED STATES PATENT OFFICE.

CLIO B. YAW, OF ARLINGTON, NEW JERSEY, ASSIGNOR TO REMINGTON TYPEWRITER COMPANY, OF ILION, NEW YORK, A CORPORATION OF NEW YORK.

TYPE-WRITING MACHINE.

984,338.   Specification of Letters Patent.   Patented Feb. 14, 1911.

Application filed January 21, 1909. Serial No. 473,415.

*To all whom it may concern:*

Be it known that I, CLIO B. YAW, a citizen of the United States, and resident of Arlington, in the county of Hudson and State of New Jersey, have invented certain new and useful Improvements in Type-Writing Machines, of which the following is a specification.

My invention relates especially to tabulating mechanism for typewriting machines and its main object is to provide improved column selecting devices whereby the carriage or traveling element of the machine, after being released, may be arrested at a predetermined columnar position, intermediate columns being skipped or passed.

To the above and other ends my invention consists in the features of construction, combinations of devices and arrangements of parts hereinafter described and particularly pointed out in the claims.

My invention is shown as adapted to a No. 10 Remington typewriter but the nature of said invention is such that it may be applied to other forms of writing machines.

Figure 1:
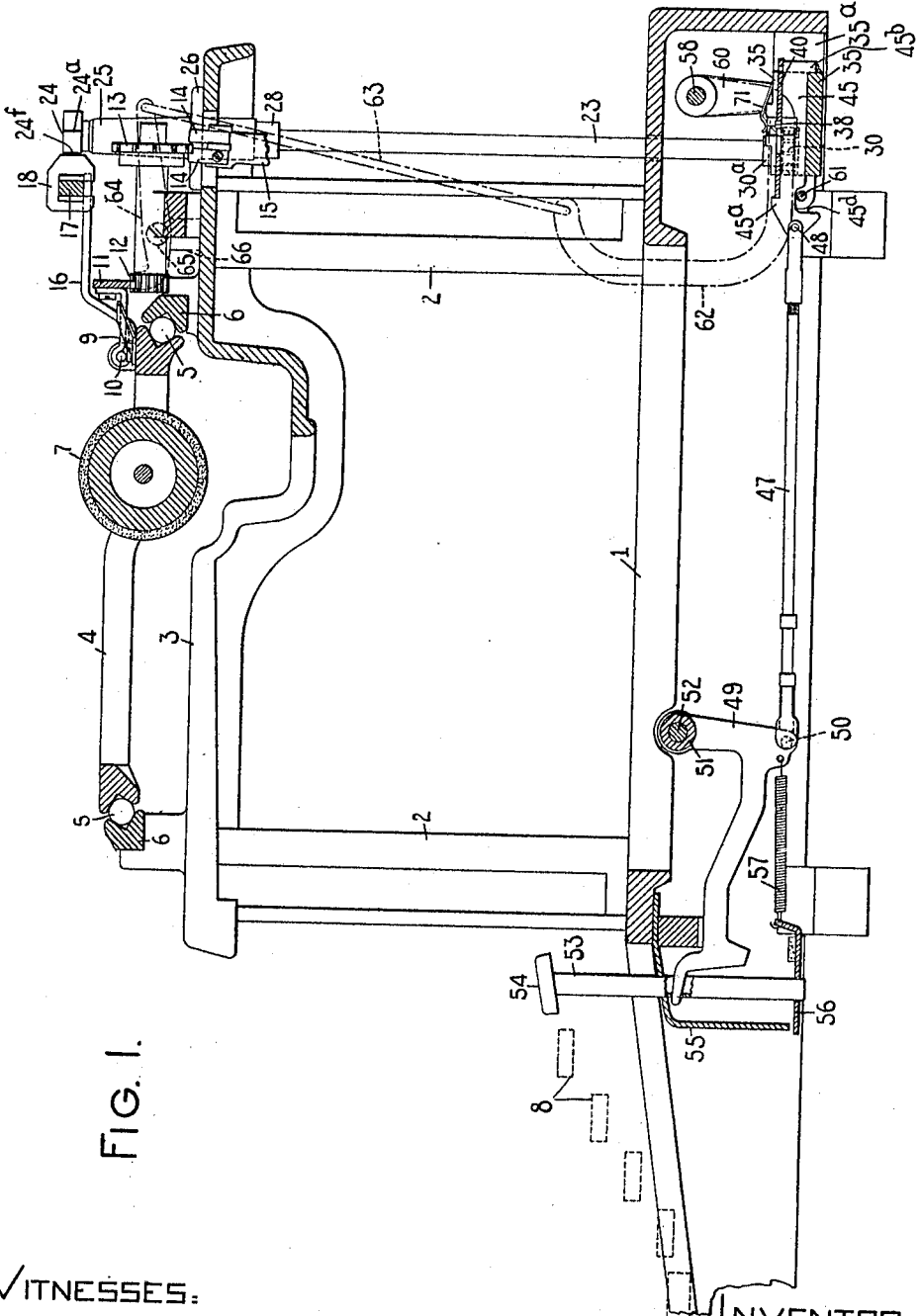
Figure 2:
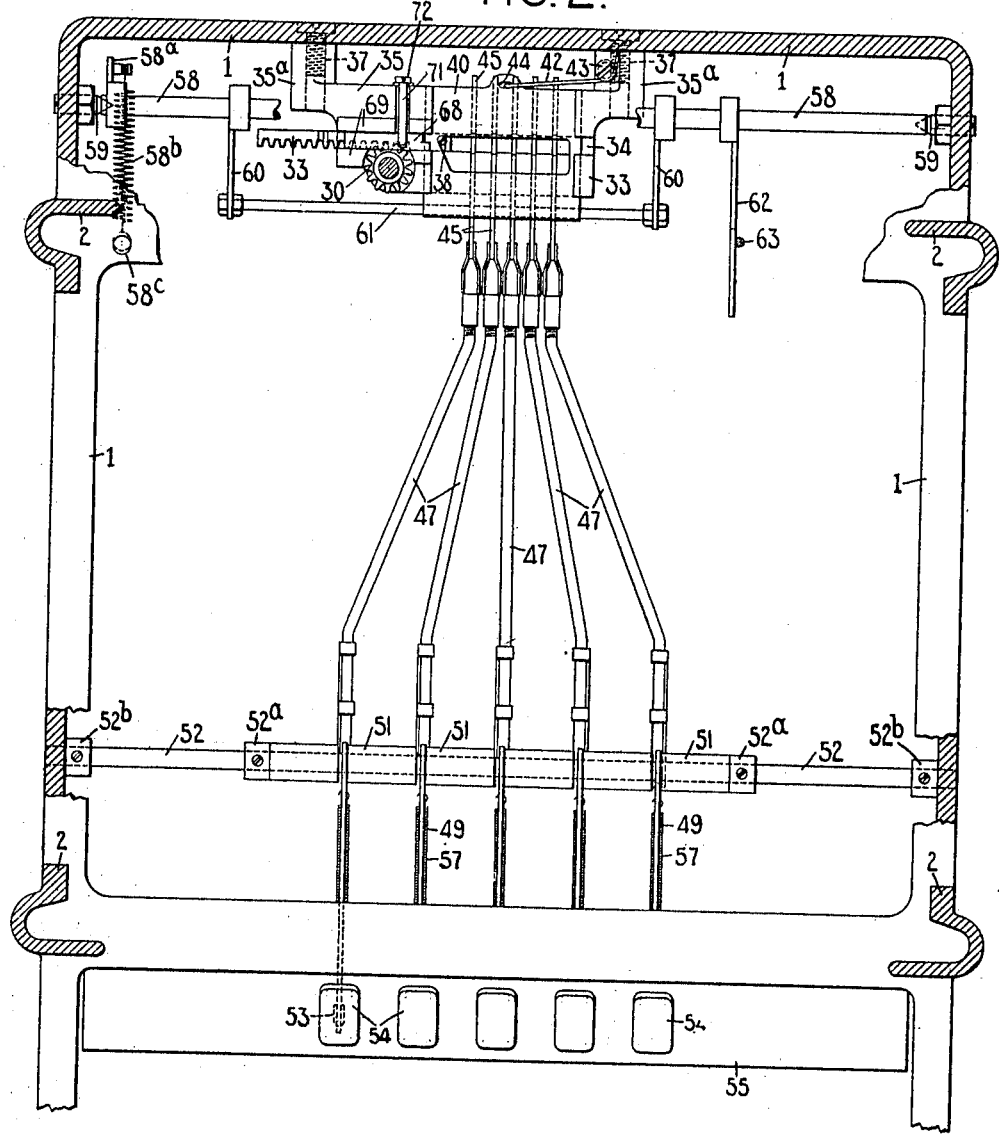
Figure 3:
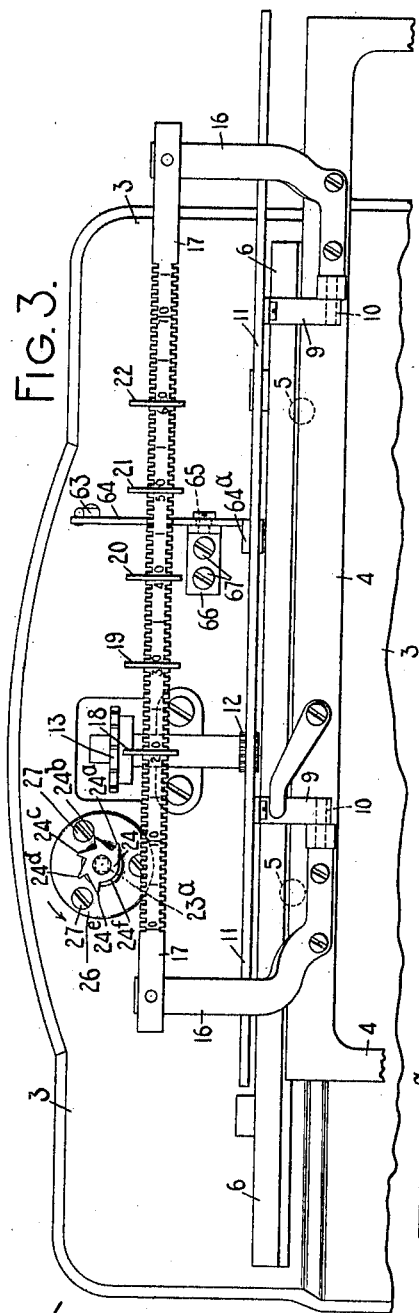
Figures 4, 5, 6:
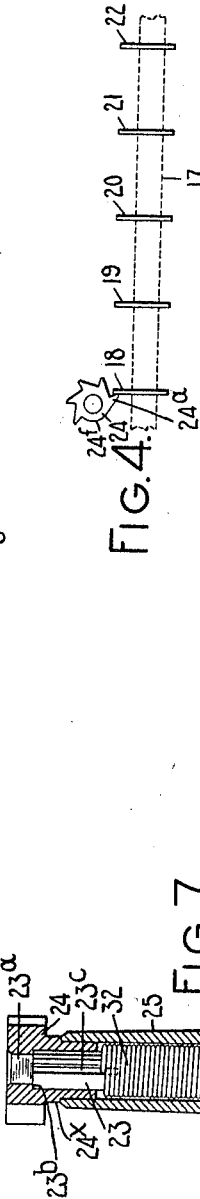
Figure 7:
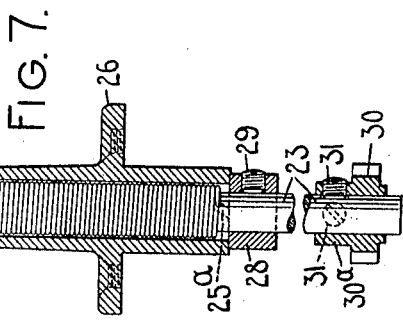

In the accompanying drawings, Figure 1 is a fragmentary vertical front to rear sectional view of a No. 10 Remington typewriting machine embodying my invention, parts of the machine being omitted. Fig. 2 is a fragmentary horizontal sectional view taken on a plane just above the base of the machine, the top face of the rear of the base being broken away to expose some of the column selecting devices. Fig. 3 is a fragmentary top plan view showing the upper rear part of the machine. Figs. 4, 5 and 6 are operating views showing various relations between a part hereinafter termed a column selector head or multiple stop and the set of column stops or tappets. Fig. 7 is a vertical sectional view of the column selector head, the shaft carrying the same and the mounting of said shaft. Fig. 8 is a fragmentary perspective view of the column selecting devices. Fig. 9 is a fragmentary top plan view of the column selecting devices which are mounted on the base of the machine. Fig. 10 is a view corresponding with Fig. 9 but showing different relations of parts. Fig. 11 is a vertical sectional view taken on a plane represented by the dotted line $x$—$x$ in Fig. 9 and looking in the direction of the arrows at said line, the base of the machine and other parts omitted in Fig. 9 being shown in Fig. 11. Fig. 12 is a vertical sectional view taken on a plane represented by the dotted line $y$ in Fig. 10 and looking in the direction of the arrow at said line.

Referring first to Figs. 1, 2 and 3, the main frame of the machine comprises a base 1, corner posts 2 and a top plate 3. A carriage 4 connected by ball bearings 5 with fixed track-ways 6 carries a platen 7 with the front face whereof the type bars (not shown) coöperate when the type actuating devices controlled by the finger keys 8 are actuated. Fixed to arms 9 pivoted at 10 on the rear bar of the carriage is a spring-pressed feed rack 11 which normally meshes with a feed pinion 12 operatively connected with a toothed escapement wheel 13. Escapement dogs 14 mounted at the top of a dog rocker 15 are controlled by the usual universal bar (not shown) which is actuated by the key levers so as to cause step-by-step movements of the carriage leftward under the pull of the usual main spring (not shown).

Arms 16 screwed to the rear bar of the carriage have suitably secured at their rear ends a toothed column stop bar 17 on which are adjustably mounted a set of column stops or tappets. These column stops are or may be of ordinary construction and are all alike, their operative faces extending the same distance rearward from the support or bar 17, but for convenience of description will be given separate numbers. Five column stops are shown, numbered from left to right respectively, 18, 19, 20, 21 and 22.

The column selecting devices comprise an upright rotatory shaft which carries at its upper end a multiple stop or head having teeth, each of which is adapted to coact with one or another of the column stops to arrest the carriage, the extent of rotation of the shaft for this purpose being controlled by selective mechanism connected with the lower end of said shaft and operated by a set of column selecting keys. Said shaft is best illustrated in Figs. 1 and 7 and is numbered 23. The upper end of the shaft is reduced and squared at $23^a$ forming a shoulder $23^b$. The selective head or multiple stop member 24 comprises five radially projecting ratchet-like teeth numbered respectively $24^a$, $24^b$, $24^c$, $24^d$ and $24^e$ and a smooth circular portion 24$^f$ between the first and last teeth, and is formed with a downwardly extending hub or bearing portion 24$^x$. Said hub is perforated to fit over the upper end of the shaft 23, the perforation extending entirely through the head 24, but being square at the upper part of the head to coöperate with the squared end 23$^a$ of the shaft. Said squared end is spread or off-set so as to clamp the head 24 tightly against the shoulder 23$^b$ and cause said head and said shaft to operate as a single piece. The lower portion of the hub 24$^x$ is reduced to fit into a tubular bearing member 25, the shoulder formed by the reduced end portion of said hub bearing on the top of the bearing member. Said bearing member extends downward through an opening in the top plate 3 and is provided with a circular flange 26 which rests on said top plate, the bearing member being fixed to the top plate by screws 27 passing through the flange 26 into the top plate. The shaft 23 extends downward through the bore of the tubular bearing 25 and carries a collar 28 which is secured by a set screw 29 to the shaft so as to abut against the bottom of the bearing 25 and prevent upward movement of the shaft therein. Downward movement of the shaft in the bearing is prevented by the shoulder on the hub 24$^x$. The shaft, then, while freely rotatable is incapable of longitudinal movement. The shaft 23 extends downward through a hole in the top face of the rear portion of the base 1 and carries a toothed wheel or pinion 30 having a hub 30$^a$ which receives set screws 31, thereby securing the toothed wheel 30 to the lower end portion of the shaft 23. Surrounding the shaft 23 within the bearing or housing 25 is a coiled spring 32, the upper end of which is secured to the slot 23$^c$ in the shaft 23 and the lower end of which engages a slot 25$^a$ in the bearing 25. The spring tends to turn the shaft 23 and head 24 in the direction of the arrow in Fig. 3. Normally the circular portion 24$^f$ faces the column stops but its radius is too short to permit it to engage the column stops, so that the carriage may move freely back and forth except when the head 24 is turned to bring one of its stops into operative position, these stops of course extending farther from the center of rotation of the head than does the circular face 24$^f$ so as to engage the column stops.

The turning movements of the shaft 23 are controlled by devices which include a rack bar 33 which meshes with the pinion 30 and is adapted to slide parallel to the travel of the carriage in a way or track 34 formed in a support or bracket 35 best shown in Figs. 2 and 8. At its ends the bracket is provided with lugs or ears 35$^a$ formed with tapped holes 36 which receive headed screws 37, said screws passing through holes in the rear vertical wall of the base and securing the bracket 35 to the frame of the machine within said base. The bracket 35 extends forward from said rear wall and the slot 34 is formed in its upper face. The bracket is cut away at 35$^b$ to provide room for the pinion 30, and the lower end of the shaft 23 bears in a depression formed in the bottom face of said cut-away, the lower portion of the shaft 23 being thereby held from lateral movement and the path of the pinion 30, as it turns to coöperate with the slidable rack bar 33, being fixed. Said rack bar has a pin or lug 38 projecting upward from its right-hand end portion and entering a cut-out or slot 39 in a plate or universal bar 40 that is slidable above the rack bar 33 and transversely thereof in grooves or guideways 41 in the bracket 35. The left end 39$^a$ of the slot 39 is formed at an angle to the line of motion of the universal bar 40 so that when said universal bar is moved rearward the inclined or cam edge 39$^a$ acts on the pin 38 to cam the rack bar 33 in its ways a short distance toward the right, which motion serves to partially rotate the pinion 30 as well as the shaft 23 and the head 24 so that the tooth or stop 24$^a$ is rotated into the path of travel of the tappets or column stops on the carriage. This operation effects what may be called the initial setting of the selecting stop devices. When the carriage is subsequently released as hereinafter explained, and travels leftward, those tappets thereon which at the time are at the right of the selecting head successively strike the stops of said selecting head and turn said stops and the shaft 23 step-by-step so that the series of column selecting stops are successively brought into working position in the path of the tappets or column stops.

The head 24 is maintained normally in the position shown in Figs. 3 and 8 with the circular face 24$^f$ opposite the tappets by reason of the fact that the coiled restoring spring 32 acts through the shaft 23 and pinion 30 on the rack bar 33 to maintain the pin 38 in contact with the rear end of the inclined edge 39$^a$, the normal position whereof is uniformly the same. A wire restoring spring 42 is secured by a screw 43 to the top of the right-hand lug 35$^a$, the free end of said spring engaging in a slot 44 in the slide 40 and tending constantly to press said slide forward so that normally its front edge engages with lugs or projections extending upward on the forward end portions of slide bars 45, said lugs each being designated as 45$^a$. Each of these slide bars is adapted to operate the slide or universal bar or plate 40. The slide bars are vertically arranged side by side in kerfs or slot ways 46 extending fore and aft of the machine transversely of the way 34. Each slide bar is provided at its rear end with a bearing lug 45ᵇ which is normally maintained in contact with the rear face of the bracket 35 by the combined action of the spring 42 and of the restoring springs with which the actuating devices for said slide bars are provided. The actuating devices for each slide bar comprise an adjustable link 47 pivotally connected at 48 with its associate slide bar 45 and extending horizontally forward beneath the printing key levers of the machine to an angular lever 49 to which said link is pivotally connected at 50. Each angular lever is formed with a hub 51 through which passes a pivot rod 52, said pivot rod extending from side to side of the machine and being supported in the sides of the base. The hubs 51 space the levers 49 apart lengthwise of the rod 52 and the set of connecting links 47 fan outward as they extend forward as shown in Fig. 2, so that the forward ends of said links are spaced apart corresponding to the spacing of the levers 49 with which they are connected. Said levers 49 are maintained in the proper position lengthwise of the rod 52 by collars 52ᵃ fixed to the rod 52 and abutting against the outside hubs of the set of hubs 51. Displacement of the rod 52 is prevented by collars 52ᵇ fixed to said rod and abutting the inner faces of the sides of the base 1. The forward end of each angular lever engages in an opening in a key stem 53 provided with a key button 54. Each key stem is vertically slidable in openings in guide plates 55 and 56 suitably secured to the base 1.

The buttons or column selecting keys 54 are arranged in rear of and slightly above the regular keyboard of the machine. A coiled restoring spring 57 is connected at one end to each angular lever 49 and at the other end to the guide plate 56, said restoring spring tending to maintain the key stem 53, lever 49, link 47 and slide bar 45 in the normal position shown in Figs. 1 and 2. When in normal position a cut-out 45ᶜ with which each slide bar is provided registers with the slide-way 34 (Fig. 8) and as said cut-outs are slightly greater both in width and depth than the width and depth of the slide-way 34, it follows that when the slide bars 45 are in normal position the full length of the slide-way 34 to the right of the rack bar 33 is entirely open and unobstructed.

The slide bars are arranged in parallelism at right angles to the path of travel of the rack bar and the portions of said slide bars forward of the cut-outs 45ᶜ constitute stops which limit the travel of the rack bar different distances according to the particular slide bar operated. The distance between each slide bar is so related to the rotary travel of the head 24 that the travel of the rack bar 33 from one slide bar to the next is sufficient to bring successive selecting stops on the head 24 into operation.

Besides its function of moving the universal bar 40 to effect an initial positioning of the selecting head and its function of acting as a stop for the rack bar 33, which rack bar after the initial positioning operation is driven step-by-step by successive tappets on the carriage, each slide bar has the additional function of releasing the carriage after the throwing into operative position of the column selecting mechanism. The releasing means operative by the slide bars comprise a rock shaft 58 pivoted at its ends on pivot screws 59 secured in the sides of the base. The rock shaft is provided with two downwardly and forwardly extending angular arms 60 spaced apart so as to be outside the bracket 35. At the front ends of said arms is secured a cross rod or bar 61 which is received in cut-outs 45ᵈ in the under sides of the slide rods 45, the forward edge portions of said cut-outs being extended downward and forming devices for operating the rod or bar 61. At the right-hand end of the rock shaft 58 is secured a curved arm 62 which extends downward, forward, upward and then rearward, and is connected to the lower end of a link 63, the upper end whereof is connected to the rear arm of a releasing device or lever 64. As best shown in Fig. 3 said lever is pivoted at 65 to a bracket 66 secured by screws 67 to the top plate. The forward end of the lever 64 is provided with a releasing device which in the present instance is in the form of a lifting shoe 64ᵃ underlying the feed rack 11 but normally disconnected therefrom. An arm 58ᵃ depending from the left end portion of the rock shaft 58 has connected to it one end of a coiled restoring spring 58ᵇ, the other end whereof is hooked around a fixed pin 58ᶜ, the spring assisting to restore the rock shaft and connected parts to normal position after operation. By this construction when any one of the slide bars 45 is pushed rearward it acts on the rod 61 to turn the rock shaft 58, depressing the rocker arm 62 and pulling down the link 63 so as to elevate the forward arm of the lever 64 and cause the lifting shoe 64ᵃ to lift the feed rack 11 and disengage it from the feed pinion 12, thereby freeing the carriage from its escapement devices. If, for example, the fourth selector key 54 be depressed, it operates to turn the associate lever 49, push the link 47 and slide the corresponding slide bar 45 rearward first to the position shown in Fig. 9. During this movement of the slide bar the lug 45ᵃ moves the universal plate 40 rearward from normal position to that shown in Fig. 9, causing the cam edge 39ᵃ, acting on the pin 38, to move the rack bar 33 toward the right, thereby rotating and setting the head 24 in initial operative position, with the stop or tooth 24ª in the path of the column stops or tappets as shown in Fig. 4. There is, as will be noted from Fig. 1, considerable lost motion between the rod 61 and the actuating edge of the slide rod 45 and consequently during the first part of the initial setting operation the rod 61 will not be operated. As the rearward motion of the actuated slide bar 45 continues, however, after the lost motion is taken up, said slide bar will take up the rod or bar 61 and effect the release of the carriage in the manner before described. By this construction movement of the stop 24ª into the path of the tappets before the release of the carriage is insured. When the first tappet or column stop 18 strikes the selector stop 24ª as shown in Fig. 4, it causes a partial rotation of the shaft 23 which in turn moves the rack bar 33 one step toward the right, and the selector stop 24ᵇ is brought into operative position. Thus one after another the remaining column stops or tappets on the carriage strike the succeeding selector stops after they have been operatively positioned and thus the rack bar 33 is moved step-by-step until its right-hand end strikes against the interposed slide bar, which is the fourth slide bar, so that the carriage is arrested by the engagement of said slide bar which prevents further turning of the head 24 and causes the stop 24ᵈ to arrest the tappet or column stop 21.

In order to prevent retraction of the head 24 between operations of successive tappets or column stops during the run of the carriage, a pawl and ratchet device is employed operative on the rack bar 33, said pawl and ratchet device being normally inoperative and being automatically brought into operation as the universal bar 40 slides rearward from normal position. Referring to Figs. 8 to 12, inclusive, it will be noted that the top face of the rack bar 33 is formed with cut-aways or depressions 33ª forming ratchet teeth, each cut-away having a right-hand vertical face and a left-hand inclined face, there being in the present instance four vertical or detaining faces formed by the depressions 33ª. Coöperative with said depressions 33ª is a detent or pawl member 68 arranged between ribs 69 on the bracket 35, said pawl member being pivoted on a cross pin 70 extending between said ribs. A leaf spring 71 is arranged in a cut-out or slot 69ª formed transversely in the rearmost rib 69 and in the adjacent portion of the bracket 35 and is secured by a headed screw 72 to the rear face of the bracket 35, said spring bearing at its free end on the top of the pawl member 69, tending to press said pawl member into engagement with the rack bar 32. The pawl member is provided with downwardly directed extensions or teeth 68ª and 68ᵇ, the rear tooth 68ª being at the left of the universal plate 40 and engageable with the depressions 33ª and the ratchet teeth formed thereby in the rack bar 33; while the forward tooth 68ᵇ is adapted to coöperate with the downwardly beveled or inclined rear edge 40ª of a slot 40ᵇ formed at the left side of said universal plate 40. Normally the tooth 68ᵇ lies on the top of the universal plate 40 in rear of the slot 40ᵇ, as shown clearly in Fig. 8, thereby maintaining the tooth 68ᵇ elevated above the rack bar 33. When the universal plate 40 is pushed rearward by one of the slide bars 45 to the position shown in Fig. 9, the tooth 68ᵇ slides down the beveled edge 40ª into the slot 40ᵇ, causing a slight downward rotation of the pawl member 68 on its pivot 70 and permitting the pawl tooth 68ª to engage with the top of the rack bar 33. Thereafter when the rack bar 33 is moved rightward by the operation of the tappet 18 and the stop 24ª the tooth 68ª will drop into the right-hand depression 33ª. The result will be that after the tappet 18 passes the stop 24ª, the rack bar 33 will be prevented from being retracted leftward by the engagement of the vertical face of the right-hand depression 33ª with the tooth 68ª, said tooth thus serving as a detent device to retain the rack bar 33 in advanced position until the next tappet 19 comes along and co-acts with the stop 24ᵇ to advance the rack bar 33 another step and cause the detent device 68ª to engage with the second depression 33ª from the right. The rack bar 33 will thereupon be detained in the second advanced position until the tappet 20 engages with the tooth 24ᶜ to cause a further rotation of the head 24 as the carriage advances, thus permitting the detent tooth 68ª to drop in the third depression 33ª as shown in Fig. 12. Fig. 12 corresponds with the dotted line position of the head 24 in Fig. 5, this being the position to which said head will be turned by the tappet 20 to permit said tappet to pass said head and to attain the full line position of said tappet shown in said Fig. 5. As soon as the tappet 20 passes the head 24 said head will be turned back to the full line position shown in Fig. 5 by the spring 32. Further retraction of the head at this time will be prevented by the engagement of the vertical face of the third depression or notch 33ª with the detent tooth 68.

On release of the actuated stop bar or plate 45 the universal plate 40 will return to normal position and in doing so the inclined edge 40ª will engage the tooth 68ᵇ and cam said tooth up until it reaches the top surface of the plate 40 and slides therealong until said plate reaches the normal position. The forcing upward of said tooth 68ᵇ effects an upward movement of the pawl or detent member 68 and lifts the detent tooth 68ª away from the rack bar 33, permitting said rack bar to be restored to normal position by the spring 32. If for any reason it should be desired to further advance the carriage prior to operating the printing keys, this may be done by actuating the column selecting key next succeeding the one last actuated.

I have described the operation of my invention when the fourth column selecting key and parts controlled thereby are operated, showing that the carriage passes intermediate columns in part defined by tappets preceding the arresting tappet, which preceding tappets are at the right of the multiple stop or selecting head when the carriage is released. It will be apparent that if prior to the columnating operation any tappets shall have passed the multiple stop or selecting head, such tappets will not affect said head during such columnating operation; that the columns to which the column selecting keys relate will always be the columns which are in part defined by those tappets or column stops which at the time of the operation of said column selecting keys have not passed the selecting head but are at the right-hand side thereof; and that the carriage when released will run uninterruptedly to the selected columnar position, skipping any intermediate columns. Although I have illustrated five column selecting keys with their associate slide bars or plates 45 and connections, said number may be increased or diminished at pleasure and other changes may be made without departing from my invention.

It will be noted that by my present invention I provide a column selecting mechanism for typewriting machines embodying a multiple stop member or device provided with a plurality of stop faces and rotatable to bring the selected stop face thereon into operative position and there to arrest said selected stop face; that a plurality of column stops or tappets are provided; that said column stops are herein adjustably arranged lengthwise of the carriage travel; that said column stops are adapted to coöperate with said multiple stop to rotate the same; that means (in the present case, the spring 32) are provided to rotate said multiple stop to render it inoperative; that the rotation of said multiple stop by said spring is in the opposite direction from the rotation of said multiple stop by said column stops; that key-operated means are provided for imparting an initial rotative movement to said multiple stop member and for limiting the rotation of said member; that in the present instance the rotative movement limited by said key-operated means is a rotative movement imparted to said stop member by said column stops; that the stop faces on said multiple stop are radially arranged, that is, they radiate from the center of rotation of said multiple stop; that the axis of said multiple stop is transverse of the line of carriage travel; that a circular face is formed on said multiple stop nearer the center of rotation thereof than are said radial faces; that normally said circular face is maintained opposite or facing the column stops or tappets by the spring restoring means 32 acting in conjunction with limiting means, said limiting means in the present instance comprising the pin 38 and the inclined edge 39ᵃ; that the key operated means for turning said multiple stop includes a universal bar operated by each of the column selecting keys, said universal bar in the present instance being in the form of a slidable plate; and that another universal bar is provided operative by each of the column selecting keys, which other universal bar is in the form of a cross rod connected by arms to a rock shaft and operative to release the carriage from its step-by-step feeding mechanism.

Certain features herein disclosed are not claimed as they are the invention of John H. Barr, as appears from his Patent No. 975,110, granted November 8, 1910. My construction resembles that of the patent aforesaid in that the axis of rotation of the multiple stop is at right angles to the line or direction of travel of the column stops, but is unlike the patented construction in that the multiple stop is permanently arranged in the plane of travel of the column stops instead of being movable in and out of said plane as in the patent. Furthermore, in my construction the circular or additional surface or face of the multiple stop device stands normally opposite to or facing the column stops.

What I claim as new and desire to secure by Letters Patent, is:—

1. In a column selecting mechanism for typewriting machines, the combination of a rotatable multiple stop having a plurality of stop faces, means for rotating said multiple stop to bring a stop face thereon into operative position, a plurality of column stops operative to rotate said multiple stop, and means for rotating said multiple stop to render it inoperative.

2. In a column selecting mechanism for typewriting machines, the combination of a rotatable multiple stop having a plurality of stop faces, means for rotating said multiple stop in one direction to bring a selected stop face thereon into operative position, a column stop for rotating said multiple stop in the same direction, a spring for rotating said multiple stop in the opposite direction, and means coöperating with said multiple stop to limit the action of said spring and to maintain said multiple stop normally in inoperative position.

3. In a column selecting mechanism for typewriting machines, the combination of column stops, a rotative stop device having a series of stops thereon for coöperation with said column stops, said column stops being operative to turn said rotative stop device, and key-operated means for imparting an initial rotative movement to said rotative stop device and for limiting the rotation of said device.

4. In a column selecting mechanism for typewriting machines, the combination of a plurality of column stops, a rotative multiple stop, said column stops being operative to turn said multiple stop, column selecting keys, and means operative by said keys for imparting an initial rotative movement to said multiple stop, said means also operating subsequently to limit the rotation of said multiple stop by said column stops.

5. In a column selecting mechanism for typewriting machines, the combination of a plurality of column stops, a rotatable multiple stop having its axis transverse of the line of carriage travel and having a plurality of radial stop faces and an additional face arranged nearer the center of rotation of said multiple stop than are said radial stop faces, means for rotating said multiple stop to render selected stop faces thereon coöperative with said column stops, and means for rotating said multiple stop in the opposite direction to bring said additional face opposite said column stops.

6. In a column selecting mechanism for typewriting machines, the combination of a plurality of column stops, a rotatable multiple stop having its axis transverse of the line of carriage travel and having a plurality of radial stop faces and an additional face arranged nearer the center of rotation of said multiple stop than are said radial stop faces, means for rotating said multiple stop to render selected stop faces thereon coöperative with said column stops, a spring for rotating said multiple stop backward, and limiting means for maintaining normally said additional face opposite said column stops.

7. In a column selecting mechanism for typewriting machines, the combination of a plurality of column stops, a multiple stop having a plurality of stop faces, a vertically disposed shaft to the upper end of which said multiple stop is fixed, means for preventing endwise movement of said shaft, and key-controlled selecting means coöperative with the lower end of said shaft to turn it and thereby render said multiple stop operative.

8. In a column selecting mechanism for typewriting machines, the combination of a plurality of column stops, a multiple stop coöperative therewith, a shaft carrying said multiple stop, a tubular bearing member through which said shaft passes, means coöperative with said bearing member to prevent endwise movement of said shaft, a restoring spring connected with said shaft and housed within said bearing member, and key-controlled column selecting devices coöperative with said shaft.

9. In a column selecting mechanism for typewriting machines, the combination of a plurality of column stops, a coöperative multiple stop having its axis transverse of the line of carriage travel, a rack and pinion for turning said multiple stop, and a key-operated slidable plate for moving said rack longitudinally.

10. In a column selecting mechanism for typewriting machines, the combination of a plurality of column stops, a rotatable multiple stop coöperative therewith but normally inoperative, the axis of said multiple stop being transverse of the line of carriage travel, and means including a key controlled universal bar for turning said multiple stop to initially position it for coöperation with said column stops.

11. In a column selecting mechanism for typewriting machines, the combination of a plurality of column stops, a coöperative multiple stop, devices including a rack for turning said multiple stop, and means for actuating said rack, said actuating means including a universal bar, and key controlled slide bars operative on said bar.

12. In a column selecting mechanism for typewriting machines, the combination of a plurality of column stops, a coöperative multiple stop, devices including a rack for turning said multiple stop, and means for actuating said rack, said actuating means including a universal bar, and key controlled slide bars operating to move said bar and also to arrest said rack.

13. In a column selecting mechanism for typewriting machines, the combination of a plurality of column stops, a coöperative multiple stop, devices including a rack for turning said multiple stop, and means for actuating said rack, said actuating means including a slotted plate coöperative with a pin on said rack, and slide bars for moving said plate, said slide bars also serving to arrest said rack.

14. In a column selecting mechanism for typewriting machines, the combination of a plurality of column stops, a coöperative multiple stop, devices including a rack for turning said multiple stop, means for actuating said rack, said actuating means including a plate, and a detent operative on said rack and controlled by said plate.

15. In a column selecting mechanism for typewriting machines, the combination of a plurality of column stops, a coöperative multiple stop, devices including a rack for turning said multiple stop, means for actuating said rack, a pivotally mounted detent coöperative with said rack to maintain it in one or another of a plurality of positions, and means independent of said rack for turning said detent to render the same operative and inoperative.

16. In a column selecting mechanism for typewriting machines, the combination of a plurality of column stops, a coöperative multiple stop, devices including a rack for turning said multiple stop, means for actuating said rack, a pivotally mounted detent coöperative with said rack to maintain it in one or another of a plurality of positions, and means acting on said detent normally to maintain it separated from said rack.

17. In a column selecting mechanism for typewriting machines, the combination of a plurality of column stops, a coöperative multiple stop, devices including a rack for turning said multiple stop, said rack being provided with ratchet teeth, means for actuating said rack, and a detent coöperative with said ratchet teeth.

18. In a column selecting mechanism for typewriting machines, the combination of a plurality of column stops, a coöperative multiple stop, devices including a rack for turning said multiple stop, means for actuating said rack including a universal bar, a detent member having a tooth engageable with said rack and a part engageable with said universal bar, and a spring tending to press said detent into engagement with said rack.

19. In a column selecting mechanism for typewriting machines, the combination of a plurality of column stops, a coöperative multiple stop, devices including a rack for turning said multiple stop, a universal bar member for actuating said rack, and a series of bars arranged side by side and operative on said member to move it transversely of said rack.

20. In a column selecting mechanism for typewriting machines, the combination of a plurality of column stops, a coöperative multiple stop, devices including a rack for turning said multiple stop, a universal bar for actuating said rack, carriage releasing means, and key operated bars contactive with said universal bar to actuate the same, said bars being also contactive with said rack to arrest the same and also with said carriage releasing means to actuate the same.

21. In a column selecting mechanism for typewriting machines, the combination of a plurality of column stops, a coöperative multiple stop, devices including a rack for turning said multiple stop, a universal bar for actuating said rack, carriage releasing means comprising a rock shaft and arms fixed thereto and carrying a cross rod, and key operated bars engageable both with said universal bar and with said cross rod.

22. In a column selecting mechanism for typewriting machines, the combination of a plurality of column stops, a coöperative multiple stop, devices including a rack for turning said multiple stop, a universal bar for actuating said rack, carriage releasing means comprising a rock shaft and arms fixed thereto and carrying a cross rod, and key operated slide bars engageable both with said slidable plate and said cross rod, said slide bars being contactive with said rack to limit endwise movement thereon.

23. In a column selecting mechanism for typewriting machines, the combination of a plurality of column stops, a coöperative multiple stop, devices including a rack for turning said multiple stop, a slidable plate for actuating said rack, carriage releasing devices including a cross bar, and a set of key actuated slide bars arranged side by side, said slide bars having lugs contactive with said slidable plate and being formed with depressions which receive said cross rod.

24. In a column selecting mechanism for typewriting machines, the combination of a bracket detachably secured to the frame of the machine and formed with a slide-way, and a series of parallel kerfs or slots transverse of said slide-way, said bracket also being formed with a second slide-way transverse of the first slide-way, a rack on said first named slide-way, an actuating plate for said rack in said second slide-way, key actuated bars in said transverse kerfs, said bars coöperating with said slidable plate, a column selecting stop member, connections between said stop member and said rack, and a plurality of coöperating column stops.

25. In a column selecting mechanism for typewriting machines, the combination of a plurality of column stops, a multiple stop provided with a plurality of radial stop faces and with a circular face nearer the center of rotation than said radial faces, said circular face normally facing said column stops, and means for rotating said multiple stop.

26. In a column selecting mechanism for typewriting machines, the combination of a plurality of column stops, a multiple stop permanently arranged in the plane of travel of the column stops, said multiple stop being provided with a plurality of radial stop faces and with an additional face arranged nearer the center of rotation than said radial faces, said additional face normally facing said column stops, and means for rotating said multiple stop to bring the first of said stop faces opposite the column stops.

27. In a column selecting mechanism for typewriting machines, the combination of a plurality of column stops, a multiple stop provided with a plurality of radial stop faces permanently arranged in the same plane as the working portions of said column stops, said stop faces being normally out of reach of said column stops, and means for rotating said multiple stop to bring said stop faces into coöperative relationship with said plurality of column stops.

Signed at the borough of Manhattan, city of New York, in the county of New York and State of New York this 20th day of January, A. D. 1909.

CLIO B. YAW.

Witnesses:
J. B. Deeves,
E. M. Wells.